Dec. 3, 1957

D. STARRETT 2,815,037

CONVERTIBLE DIAPHRAGM OPERATED VALVES

Filed Aug. 23, 1954

INVENTOR.
D. Starrett
BY Hudson & Young
ATTORNEYS

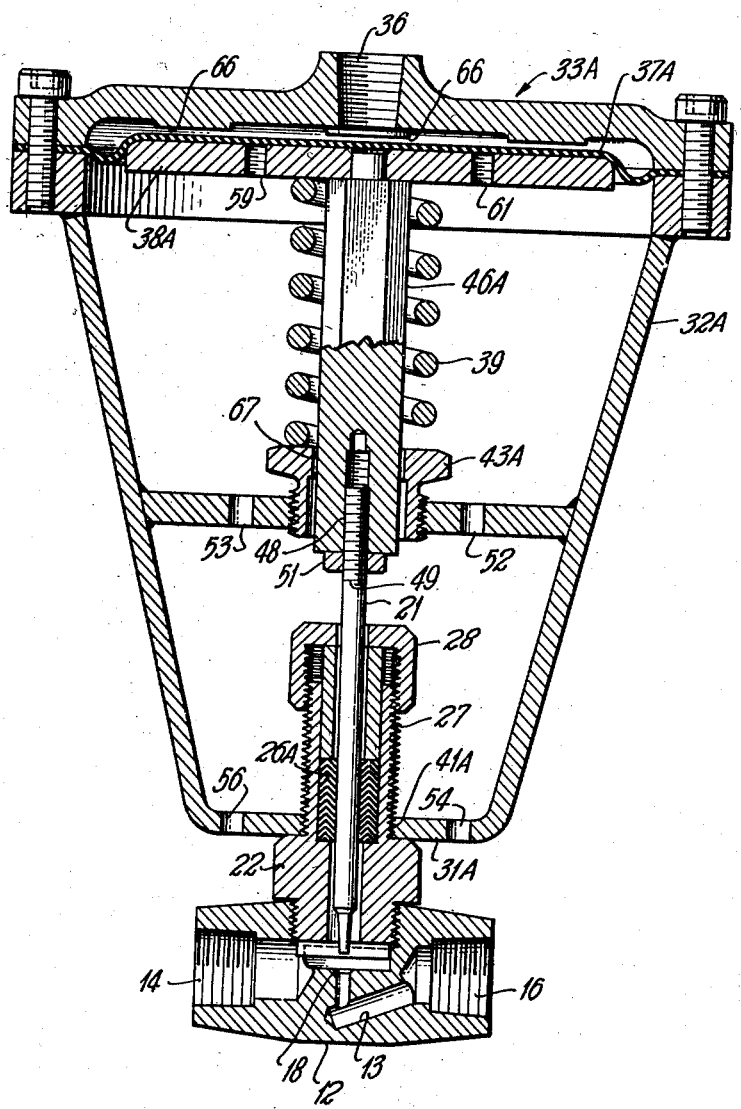

United States Patent Office 2,815,037
Patented Dec. 3, 1957

2,815,037

CONVERTIBLE DIAPHRAGM OPERATED VALVES

Delbert Starrett, Bartlesville, Okla., assignor to Phillips Petroleum Company, a corporation of Delaware Application August 23, 1954, Serial No. 451,639

5 Claims. (Cl. 137—271)

This invention relates to motor valves. In one aspect it relates to a motor valve which is readily converted from a normally open valve to a normally closed valve. In another aspect it relates to a motor valve having a valve stem which may be connected to the diaphragm plate either centrally or through a yoke to a peripheral portion of said plate.

One difficulty of motor valves of the prior art is that they are either normally open valves, or normally closed valves, and they cannot be converted from one type to the other.

One object of the present invention is to provide a motor valve which may be readily converted from a normally open to a normally closed valve.

Another object is to provide an improved type of motor valve.

Numerous other objects and advantages will be apparent to those skilled in the art upon reading the accompanying drawing, specification and claims.

In the drawings:

Figure 3 is a cross-sectional view similar to Figure 1 of a third specie of the invention.

Figure 1:
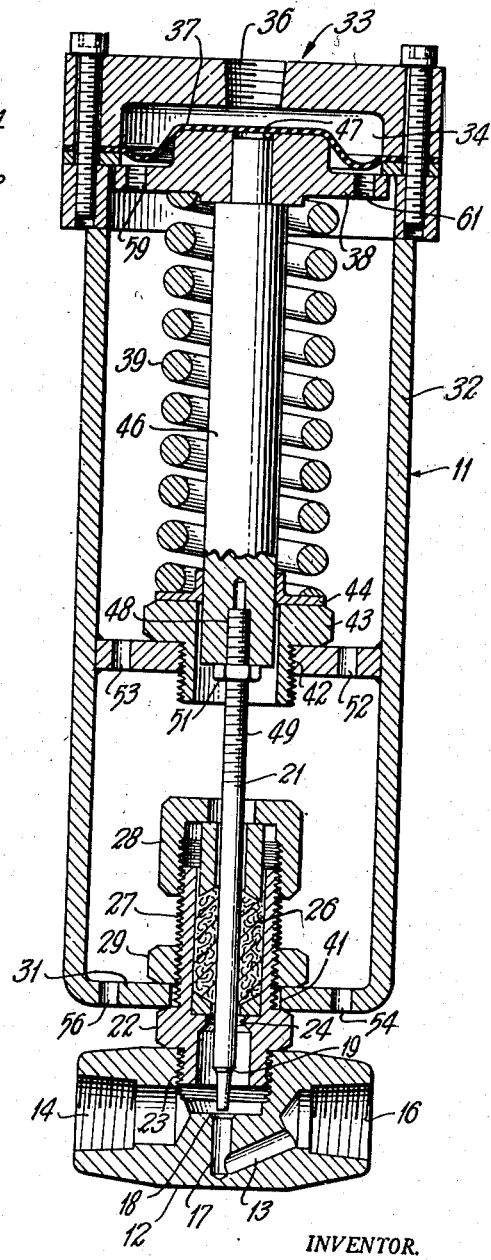
Figure 1 is a cross-section elevational view of a motor valve embodying the present invention when used as a normally open valve.

In Figure 1 a motor valve generally designated as 11 comprises in combination a valve body 12 having conduit 13, 17 for flow of fluid therethrough. Said conduit may include suitable means 14 and 16 for connection to pipes (not shown), and either 14 or 16 may be the inlet, the other being the outlet. The conduit 13, 17 may be cast in the body 12, or may be formed by the intersection of two drilled holes 13 and 17 as shown. A valve seat 18 is provided in conduit 17 and a valve 19 is disposed to move up and down in Figure 1 to and from said seat 18 for controlling flow of fluid therethrough. A valve stem 21 is connected to said valve and extends outside of said body 12.

While body 12 could be made in a single piece, it is preferable to form the same as shown with a separable portion 22 connected to portion 12 by threads 23. While valve stem 21 could merely pass through an opening 24 in portion 22, it is preferred to provide a conventional stuffing box 26.

The exterior of portion 22 is provided with external screw threads 27 which may serve the double purpose of providing adjustment of the stuffing box cap 28, but are primarily to receive nut 29 which clamps the lower end 31 of the motor housing 32 to the valve body 12 and portion 22.

A motor generally designated as 33 comprises a housing 32 secured to said body 12, said housing having a chamber 34, conduit means 36 for supplying pressure fluid (not shown) to said chamber 34, a flexible diaphragm 37 forming one wall of said chamber 34, a follower diaphragm plate 38 disposed against said diaphragm 37 on the opposite side from said chamber 34, and a spring 39 urging said plate 38 against said diaphragm 37.

Figure 2:
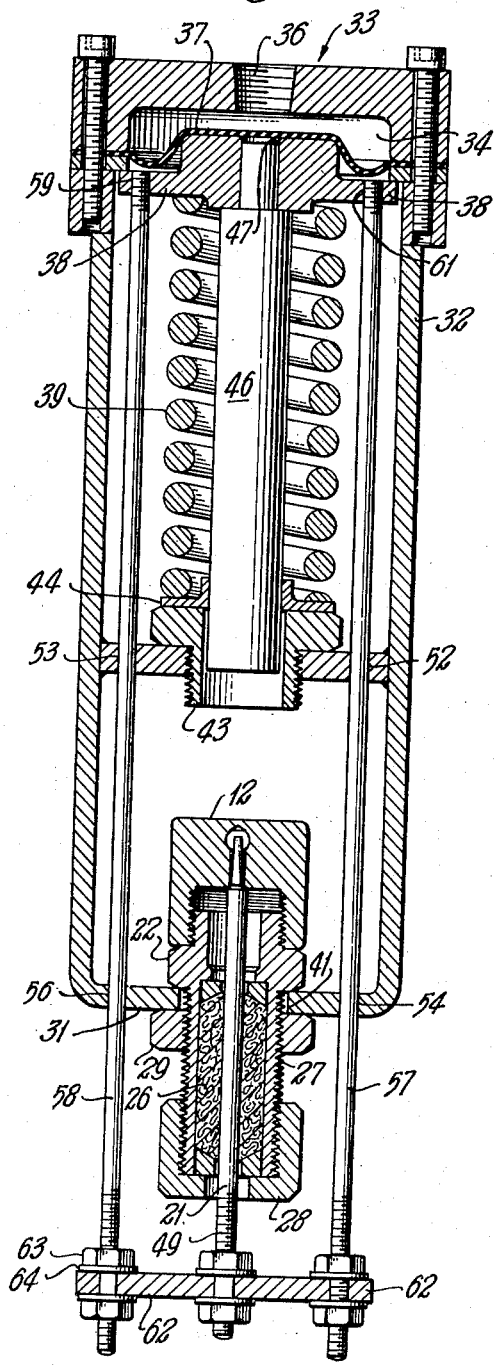
Figure 2 is a similar view of a second specie comprising the same motor valve shown in Figure 1 converted to a normally closed valve by inverting the valve body and then rotating the same 90° about its vertical axis, and by connecting the valve stem and diaphragm plate with a yoke comprising a bar and a pair of rods.

The housing 32 is formed for connection to said body 12 with said valve stem 21 disposed axially of said plate 38, either with said stem 21 extending toward said plate as shown in Figure 1, or extending away from said plate as shown in Figure 2, by passing the threaded portion 27 of the valve body through a hole 41 in said housing 32 and clamping the surrounding portion 31 in place between the bottom nut 29 and portion 22.

Housing 32 has a central threaded opening 42 in which a bushing 43 is threaded. Said spring 39 is preferably a helical compression spring as shown disposed axially of said central opening 42 between said bushing 43 and said plate 38, and a friction reducing washer 44 may be provided between bushing 43 and spring 39. The compressive force of spring 39 can be adjusted by screwing bushing 43 in or out of opening 42 to the desired extent. A guide rod 46 is attached to plate 38 by a suitable means, such as welding at 47, and this guide rod extends into bushing 43 which may act to loosely guide the same, thus controlling any tilting of plate 38 and also preventing displacement of spring 39. Guide rod 46 is provided with a central threaded opening 48 for receiving the threaded end 49 of valve stem 21 and a lock nut 51 may be provided to lock this connection.

In addition to the central opening 42 in the housing 32, said housing is also provided with peripheral openings 52, 53, 54 and 56 through which rods 57 and 58 may pass as shown in Figure 2, and plate 38 is provided with threaded openings 59 and 61 for connection to rods 57 and 58 when used as in Figure 2. In Figure 1 rods 57 and 58 are not used, but instead the means connecting valve stem 21 to plate 38 comprises said guide rod 46.

In Figure 2 it will be seen that the body 12 has been turned upside down from the position it was in in Figure 1 and has been rotated about its vertical axis 90°. This results in nut 29 being below the bottom 31 of housing 32 and the portion 22 above the same. Valve stem 21 has been unscrewed from hole 48 in guide rod 46 and is now attached to a bar 62 which in turn is connected to rods 57 and 58 to form a yoke connecting plate 38 with valve stem 21. Nuts 63 and washers 64 provide for a suitable adjustment of parts.

The motor valve shown in Figure 3 is very similar to that shown in Figure 1, and it is also adapted to having the valve body reversed and the valve stem 21 connected to the diaphragm plate 38A by bar 62 and rods 57 and 58 the same as in Figure 2.

In Figure 3 parts which are identical to those in Figures 1 and 2 have the same numerals, and those having the same function but a slightly different shape are given the same numeral followed by the letter "A," for example, the diaphragm plate having a flat top is designated 38A because it operates the same as the diaphragm plate 38 of Figure 1 but is different in shape. It is believed unnecessary to go over the parts a second time, but differences will be noted. For example, the top of the motor 33A is provided with depending bosses 66 to prevent diaphragm 37A from contacting the top of the chamber, whereas in Figure 1 the peripheral portion of plate 38 abuts the lower surface of 33 for the same purpose.

Bushing 43A is made with a central cylindrical opening 67 to reduce friction by closely fitting the edges of the polygonal surface of guide rod 46A.

Opening 41A of housing 32A is threaded which permits the elimination of the nut 29 of Fig. 1. It will be noted that housing 32A tapers upwardly and outwardly allowing for a much larger diaphragm and diaphragm plate 38A than in Figure 1 or 2.

*Operation*

In Figure 1 the valve is normally held open by spring 39. When it is desired to close the valve, pressure fluid is supplied through opening 36 which fluid acting against diaphragm 37 on plate 38 overcomes the force of spring 39, thereby forcing valve 19 to seat 18. Valve 19 also occupies intermediate positions with corresponding more or less throttling effects on the flow of fluids through seat 18 and the force of spring 39 may be adjusted with bushing 43 at anytime.

When it is desired to convert from a normally open valve of Figure 1 to a normally closed valve of Figure 2, the parts are disassembled and reassembled with the valve body 12 inverted and rotated 90° about its axis as shown in Figure 2. In converting from Figure 1 to Figure 2 it will be noted that valve stem 21 has been unscrewed from guide rod 46 and the bar 62 has been secured to stem 21 by nut 63 and washer 64 and that rods 57 and 58 now connect bar 62 and diaphragm plate 38. In either Figure 1 or Figure 2 the release of fluid through opening 36 allows spring 39 to force the diaphragm 37 and valve stem 21 upwardly.

The operation of Figure 3 is the same as the operations of Figures 1 and 2.

While specific embodiments have been shown for purposes of illustration, the invention is not limited thereto.

Having described my invention, I claim:

1. A motor valve comprising in combination a valve body having a conduit for fluid flow therethrough and a valve seat in said conduit, a valve disposed to move to and from said seat for controlling said fluid flow, a valve stem connected to said valve and extending outside of said body, a motor comprising a housing having a chamber therein, conduit means for supplying pressure fluid to said chamber, a flexible diaphragm forming one wall of said chamber, a follower diaphragm plate provided with centrally and peripherally disposed connection means, said plate being disposed against said diaphragm on the opposite side from said chamber, a spring urging said plate against said diaphragm, said housing being removably connected to said body with said valve stem disposed axially of said plate, a central opening in said housing disposed in axial alignment with said centrally disposed connection means, second openings in said housing disposed with their central axes parallel to the axis of said valve stem and axially aligned with said peripherally disposed connection means, and means connecting said valve stem to said plate through at least one of said central and second openings.

2. The combination of claim 1 in which said means comprises a yoke comprising a bar connected to said valve stem and a plurality of rods connecting said bar with a plurality of said peripherally disposed connection means through a plurality of said second openings.

3. In the combination of claim 1 in which the central opening of said housing is threaded, said combination further comprising a bushing threaded in said central opening, said spring being a helical compression spring disposed axially of said central opening between said bushing and said plate, and said means comprising a guide rod attached to said plate and extending into said bushing.

4. The combination of claim 3 in which said means further comprises a yoke comprising a bar connected to said valve stem and a plurality of rods connecting said bar with said plate through a plurality of said second openings.

5. The combination of claim 3 in which said guide rod is connected at its opposite end from said guide plate to said valve stem.

References Cited in the file of this patent

UNITED STATES PATENTS

| | | |
|---|---|---|
| 1,254,460 | Zobell | Jan. 22, 1918 |
| 1,560,656 | Brown | Nov. 10, 1925 |
| 1,585,479 | Fisher | May 18, 1926 |
| 2,683,992 | Price | July 20, 1954 |